(12) United States Patent
Garson et al.

(10) Patent No.: US 9,436,399 B2
(45) Date of Patent: *Sep. 6, 2016

(54) MANAGING CAPACITY OF A THINLY PROVISIONED STORAGE SYSTEM (71) Applicant: Microsoft Technology Licensing, LLC, Redmond, WA (US)

(72) Inventors: Matt Garson, Seattle, WA (US); Neal Christiansen, Bellevue, WA (US); Sarosh Havewala, Kirkland, WA (US); Shiv Rajpal, Sammamish, WA (US); Karan Mehra, Sammamish, WA (US); Surendra Verma, Seattle, WA (US); Daniel Chan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,625

(22) Filed: Sep. 23, 2015

(65) Prior Publication Data

US 2016/0011811 A1     Jan. 14, 2016

Related U.S. Application Data

(63) Continuation of application No. 13/852,740, filed on Mar. 28, 2013, now Pat. No. 9,146,853.

(51) Int. Cl.
*G06F 12/02* (2006.01)
*G06F 3/06* (2006.01)
(Continued)

(52) U.S. Cl.
CPC ............. *G06F 3/0619* (2013.01); *G06F 3/067* (2013.01); *G06F 3/0608* (2013.01); *G06F 3/0631* (2013.01); *G06F 3/0643* (2013.01); *G06F 3/0665* (2013.01); *G06F 3/0683* (2013.01); *G06F 12/023* (2013.01); (Continued)

(58) Field of Classification Search
None
See application file for complete search history.

(56) References Cited

U.S. PATENT DOCUMENTS

| 7,971,025 B2 | 6/2011 | Murase et al. |
| 2004/0230766 A1 | 11/2004 | Cameron |
| 2006/0242378 A1 | 10/2006 | Kano |

(Continued)

FOREIGN PATENT DOCUMENTS

EP        2568385 A1      3/2013

OTHER PUBLICATIONS

Suryanarayana, et al., "Cache Isolation and Thin Provisioning of Hypervisor Caches", In Proceedings of the IEEE 37th Conference on Local Computer Networks, Oct. 22, 2012, pp. 240-243.

(Continued)

*Primary Examiner* — Duc Doan
(74) *Attorney, Agent, or Firm* — Sunah Lee; Raghu Chinagudabha; Micky Minhas (57) ABSTRACT

A thinly provisioned storage system detects whether physical storage capacity is available when there is a request to allocate storage capacity, prior to data being written to the storage system. In particular, at the time when the file system allocates storage, such as when creating a file or performing an extending write (append) operation, allocating storage to an unallocated region of a sparse file, defragmenting a file, and the like, a storage system can verify that actual physical storage capacity is available. Thus, if there is insufficient actual physical capacity at the time when a storage allocation is attempted, then an error message can be sent and remedial action can be taken.

20 Claims, 7 Drawing Sheets

(51) Int. Cl.
*G06F 17/30* (2006.01)
*G06F 12/08* (2016.01)

(52) U.S. Cl.
CPC ........ *G06F 17/30138* (2013.01); *G06F 12/02* (2013.01); *G06F 12/08* (2013.01)

(56) References Cited

U.S. PATENT DOCUMENTS

| | | |
|---|---|---|
| 2008/0091748 A1 | 4/2008 | Beniyama et al. |
| 2008/0229048 A1 | 9/2008 | Murase et al. |
| 2008/0270720 A1 | 10/2008 | Tanabe et al. |
| 2010/0042802 A1 | 2/2010 | Helman et al. |
| 2010/0088485 A1 | 4/2010 | Ikeda et al. |
| 2010/0191908 A1 | 7/2010 | Yamakawa |
| 2011/0153977 A1 | 6/2011 | Root et al. |
| 2014/0164730 A1 | 6/2014 | Gold et al. |

OTHER PUBLICATIONS

"International Search Report & Written Opinion Issued in PCT Application No. PCT/US2013/058834", Mailed Date: Dec. 5, 2013, 10 Pages.

"International Preliminary Report on Patentability Issued in PCT Application No. PCT/US2013/058834", Mailed Date: Oct. 8, 2015, 8 Pages.

"Non-Final Office Action Issued in U.S. Appl. No. 13/852,740", Mailed Date: Jan. 13, 2015, 13 Pages.

"Notice of Allowance Issued in U.S. Appl. No. 13/852,740", Mailed Date: May 27, 2015, 7 Pages.

Allocation map 300

| Address range | Status |
|---|---|
| Range 1 | |
| A | Used |
| B | Available |
| | |
| | |
| Range 2 | |
| | |
| X | Used |
| Y | Available |
| | |

Thin Provisioning map 320

| Address range | Storage assigned |
|---|---|
| Range 1 | |
| A | Used |
| B1 | Available |
| B2 | Not yet attached |
| | |
| Range 2 | |
| | |
| X | Used |
| Y1 | Available |
| Y2 | Not yet attached |

MANAGING CAPACITY OF A THINLY PROVISIONED STORAGE SYSTEM

CROSS-REFERENCE TO RELATED APPLICATIONS

This application is a continuation application of, and claims priority to and the benefit of the filing date of, patent application Ser. No. 13/852,740, filed Mar. 28, 2013, entitled "Managing Capacity of a Thinly Provisioned Storage System", to be issued as U.S. Pat. No. 9,146,853 on Sep. 29, 2015, and which is hereby incorporated by reference.

BACKGROUND

Thinly provisioned storage systems provide the appearance of having more storage capacity than is actually available. A thinly provisioned storage system is commonly used when actual physical storage capacity is shared among multiple entities, such as people or groups of people, and when the actual physical storage used by those entities is substantially less than an amount provisioned for use by those entities.

In a thinly provisioned storage system, actual physical storage typically is allocated and used when data is written to the storage system. As storage usage increases, actual physical storage can be added into the storage system with little overhead or impact on the rest of the system.

One problem with thinly provisioned storage systems is the risk of data loss, and related outcomes due to data loss. Data loss can occur when operations that write data fail because actual physical storage is not available. Such data loss also can result in a poor user experience because allocation operations may be successful (due to thin provisioning) whereas write operations to successfully allocated storage can fail due to a lack of actual physical storage capacity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To reduce the risk of data loss and provide a better user experience, a thinly provisioned storage system detects whether actual physical storage capacity is available when there is a request to allocate storage, prior to data being written to the storage system. In particular, at the time when the file system attempts to allocate storage, such as when creating a file or performing an extending write (append) operation, a storage system can verify that actual physical storage capacity is available. Thus, if there is insufficient actual physical storage capacity when there is a request to allocate storage, then an error message can be sent and remedial action can be taken.

In one implementation, a file system maintains an allocation map that associates files with virtual storage locations, and identifying available virtual storage locations. A storage system maintains a thin provisioning map that associates virtual storage locations with actual physical storage locations, and identifying available physical storage locations. The file system can maintain a thin provisioning bitmap as a copy of the thin provisioning map. In response to a request to allocate available storage to a file, if virtual storage locations and their corresponding actual physical storage locations are available, then the virtual and physical storage locations can be allocated. However, if virtual storage locations are available, but there are no actual physical storage locations available to be allocated to those virtual storage locations, then the attempt to allocate storage fails. Because this error occurs at the time of a request for allocation of storage, instead of at the time of writing the data to storage, the risk of data loss is reduced, and a better user experience is achieved.

Accordingly, in one aspect, a file system receives a request to allocate storage for a file. Whether virtual storage space is available for the file is determined. If virtual storage space is available for the file, virtual storage space for the file is reserved, and the storage system determines whether actual physical storage space is available for the reserved virtual space. If actual physical storage space is available for the file, then the actual physical storage space for the file is reserved and associated with the virtual storage space reserved for the file.

The system can maintain an allocation map associating files with virtual storage locations and a thin provisioning map associating virtual storage locations with actual physical storage locations. The allocation operation fails if insufficient virtual storage space is available. The allocation operation also fails, and reserved virtual storage space for the file is released, if insufficient actual physical storage space is available.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which computer data storage volumes with thin provisioning can be implemented.

Figure 1:
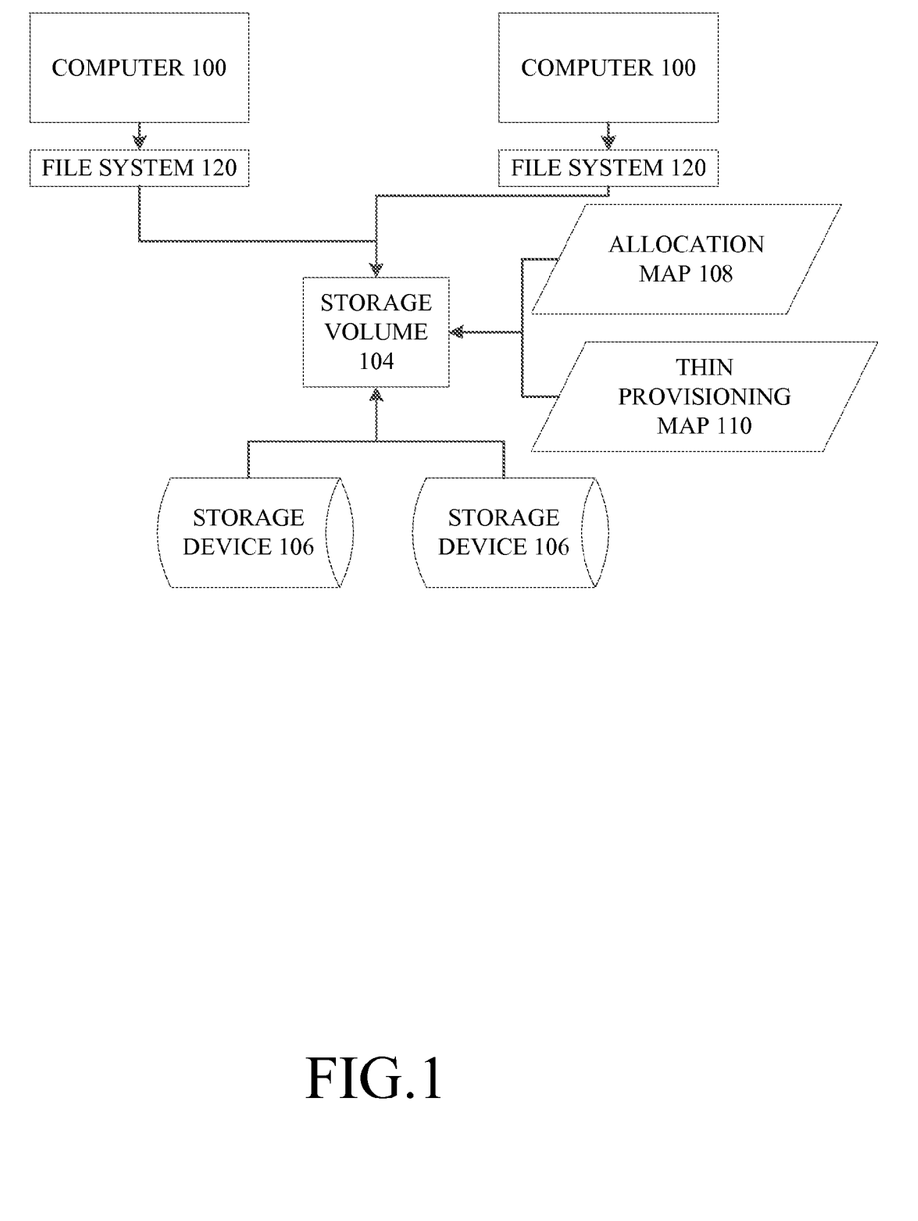
FIG. 1 is a block diagram of a computer system using thinly provisioned storage.

Referring to FIG. 1, an enterprise may include a plurality of computers 100 interconnected by a computer network (not shown). As described in more detail below, each computer 100 accesses a file system 120 which allows applications, as well as a user, to access data stored persistently in files in the file system. In one implementation, the file system is local to the computer and part of the computer's operating system. In another implementation, the file system can be accessed over a computer network and shared by multiple computers.

In general, to store data, the application and/or user selects a volume, indicative of one more storage devices, and a name for a file (such as a path of one or more directories on a volume, and a file name), in which to store the data. In turn, the system manages storing the data persistently in actual physical storage locations on the one or more storage devices that make up the volume. The system maintains information that maps a file to the actual physical storage locations on the one or more storage devices of the volume on which the data for the file is stored. In one implementation of a thinly provisioned storage system as described below, the file system maintains information that maps a file to virtual storage locations within a volume. A storage system maintains information that maps virtual storage locations to physical storage locations. A file system also can maintain a thin provisioning bitmap.

In an enterprise or other arrangement where multiple computers are sharing storage over a computer network, the system of FIG. 1 typically includes a plurality of storage volumes 104. A storage volume 104 is a logical device that can include one or more physical storage devices 106.

A storage volume can be shared by multiple users. In some instances, users are grouped into multiple groups, and each group is assigned to a partition, volume or other unit of storage. A partition is a unit of abstraction that allows a single hard drive to host multiple volumes or allowing multiple disk drives to be combined together as a single volume. In such a case, thin provisioning is common, such that each group is assigned an amount of data, e.g., one terabyte per group, but with the actual physical storage devices providing substantially less actual physical storage initially, e.g., 100 gigabytes per group.

To implement thin provisioning, the system uses two maps to allocate files to actual physical storage locations. First, one map (herein called an allocation map) 108 associates files with blocks of virtual storage of a volume. In this map, virtual storage can be either used, reserved or available. Second, for the volume, another map (herein called a thin provisioning map) 110 associates the virtual storage blocks to actual physical storage locations, if any. In this map, physical storage can be either used, reserved, available or unassigned.

For each volume, the system of the computer 100 maintains data indicating whether the volume is thinly provisioned, and, if so, these two maps 108 and 110. A volume can be represented by a data structure that includes a flag indicating whether the volume uses thin provisioning. If that flag is not set, then the volume does not use thin provisioning and the system may use a single allocation map; if the flag is set, then the volume uses thin provisioning and the system uses the allocation map and the thin provisioning map.

In general, to reduce the risk of data loss and improve the user experience, the availability of actual physical storage capacity is checked when a request to allocate storage is received. For example, when a file is created, the file system reserves blocks of virtual storage for use by the file. Further, using the thin provisioning map, actual physical storage locations for these virtual blocks of storage also are reserved by the storage system. If actual physical storage locations are not available, then an error can be indicated. Also, if actual physical storage locations are available, they can be assigned to available virtual blocks of storage.

Using such a file system, there are two types of available space within the storage system. For example, if a user is allocated one terabyte, and has used 100 gigabytes, and 100 gigabytes of actual storage has been used, the user may believe that 900 gigabytes is available, whereas the volume may report its storage as full. When reporting available space to a user, it can be advisable to report both virtual storage space available and actual physical storage space available, as described below.

Given this context, an example implementation of the thin provisioning will be described in more detail in connection with FIGS. 2-4.

Figure 2:
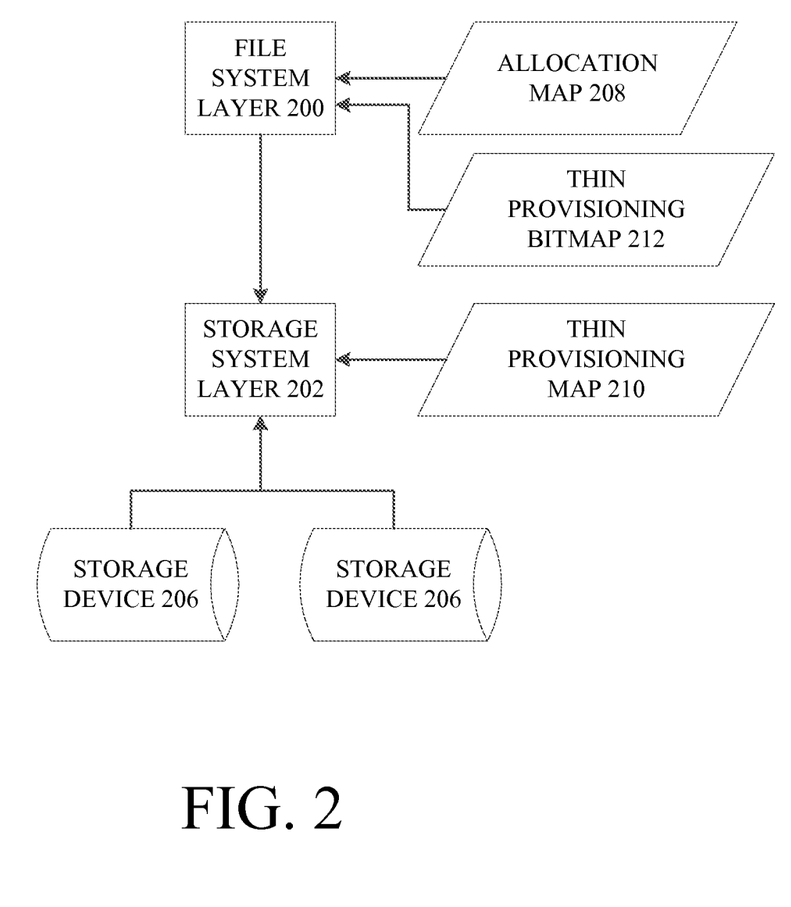
FIG. 2 is a schematic diagram illustrating an example implementation of a file system supporting thinly provisioned storage.

In FIG. 2, a schematic diagram of an implementation of the system will now be described. The file system layer 200 manages mapping files to virtual storage locations. The storage system layer 202 manages mapping virtual storage locations to actual physical storage locations in storage devices 206 if the volume is thinly provisioned. Thus the file system layer maintains an allocation map 208 and the storage system layer maintains a thin provisioning map 210. A reduced copy of the thin provisioning map 210 can be maintained by the file system as a thin provisioning bitmap 212. The storage system can be part of the same operating system as the file system and implemented as a computer program executed as part of the operating system; or the storage system can be implemented in hardware outside of the operating system.

Figure 3:
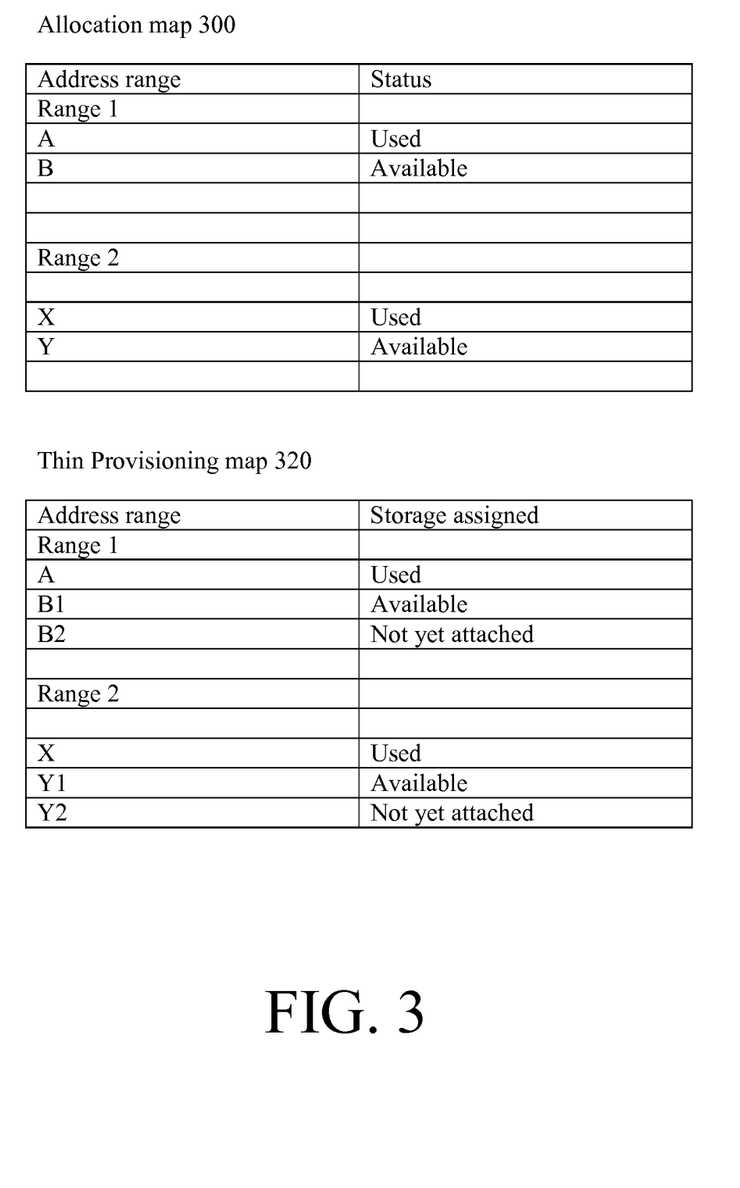
FIG. 3 is a schematic diagram of an allocation map and thin provisioning map in an example implementation of the system of FIG. 2.

FIG. 3 illustrates an example implementation of an allocation map 300 and an example thin provisioning map 320 for a thinly provisioned volume. In this example, there are two groups of users to which amounts of storage are assigned on the volume. Range 1 is assigned to group 1 and range 2 is assigned to group 2. Within range 1, the allocation map 300 indicates that range A is used, and range B is available. Similarly, in range 2, range X is used and range Y is available.

Using only the allocation map, if an application asked the file system to create a file, then the file system determines if sufficient space is available, and then selects and allocates storage from among the available space.

The thin provisioning map, however, indicates if actual physical storage is available. For example, within range 1, range A is assigned to actual physical storage in the thin provisioning map. For the sake of this example, however, assume that only part of range B is associated with actual physical storage. In this example, range B1 is associated with actual physical storage, and is unused, whereas range B2 is not associated with any actual physical storage yet. Similarly, within range 2, range X and range Y1 are assigned to actual physical storage, whereas range Y2 is not associated with any physical storage yet.

Thus, for a volume using thin provisioning, after using the allocation map to determine that there is sufficient available virtual storage space available in range Y, the file system then requests the storage system to determine whether there is sufficient actual physical storage available within range Y. For example, if the space to be used for a created file is greater than the amount of actual physical storage available, then physical storage space cannot be allocated for the created file and an error can be signaled.

Another example implementation, the file system maintains a copy of the thin provisioning map as a bitmap where each bit represents a range of virtual address space. In this implementation the range of virtual address space can be a slab, and can be 256 megabytes or more in size. If the bit is set, then actual physical storage has been provisioned. If the bit is not set, then no actual physical storage is assigned to this range (or slab). As the file system selects virtual address space for the file via the allocation map, it also checks this thin provisioning map to see if the slabs being allocated also are mapped to actual physical storage. If the slabs are not mapped to actual physical storage, they are then mapped via the storage system, and if the attempt to map fails, then the operation fails.

Figure 4:
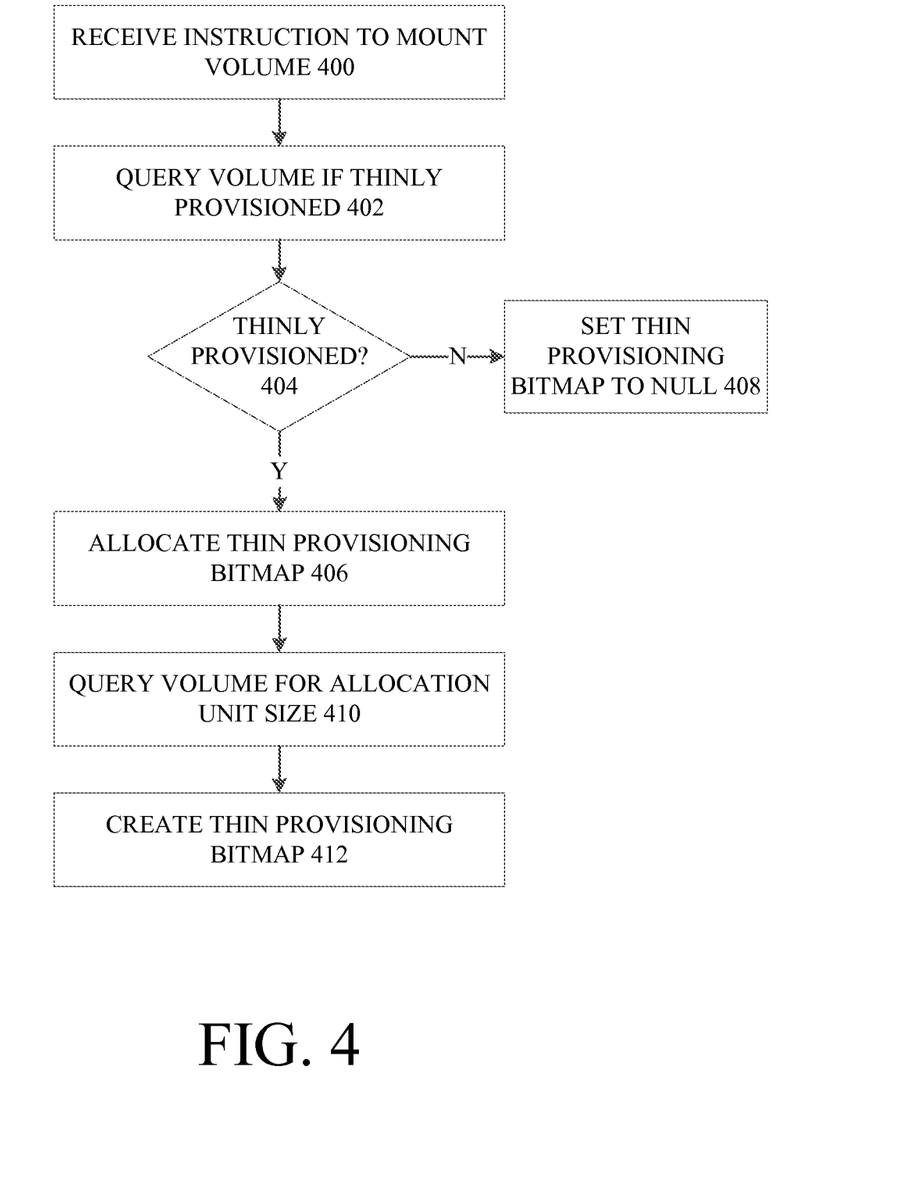
FIG. 4 is a flow chart describing an example implementation of an operation of mounting a thinly provisioned volume.

Referring now to FIG. 4, an example implementation of mounting a volume will now be described. Mounting of a volume occurs when a user, such as an administrator, instructs the file system to mount a volume. After receiving 400 an instruction to mount a volume, the file system queries 402 the volume to determine if the volume is thinly provisioned. If the volume is thinly provisioned as determined at 404, then the file system allocates 406 a thin provisioning bitmap for the volume. Otherwise, a thin provisioning bitmap for the volume is set 408 to null. To allocate the thin provisioning bitmap, the volume also is queried 410 to identify the allocation unit size. Next, the thin provisioning bitmap is created 412. For example, the storage system can construct the thin provisioning bitmap using its thin provisioning map and provide the thin provisioning bitmap to the file system. Such a volume can be created and mounted without any actual physical storage being provisioned, in which case the thin provisioning bitmap indicates there is not actual physical storage. Otherwise, when mounted, any actual physical storage associated with the volume can be indicated in the thin provisioning bitmap.

By using the thin provisioning bitmap, the file system can make fewer calls to the storage system. Note that the thin provisioning bitmap is a cache of some of the information in the thin provisioning map. Therefore, the file system ensures its thin provisioning bitmap is in sync with the actual thin provisioning map maintained by the storage system. In particular, as described below in FIG. 5 and FIG. 6, request to allocate or free storage pass through the file system to the storage system. Further, an asynchronous communication can be made from the storage system to the file system to provide the file system with any updated thin provisioning map information, or to instruct the file system to request it. Also, the file system can request a copy of the thin provisioning map from the storage system at any time, such as at the time a volume is mounted.

Figure 5:
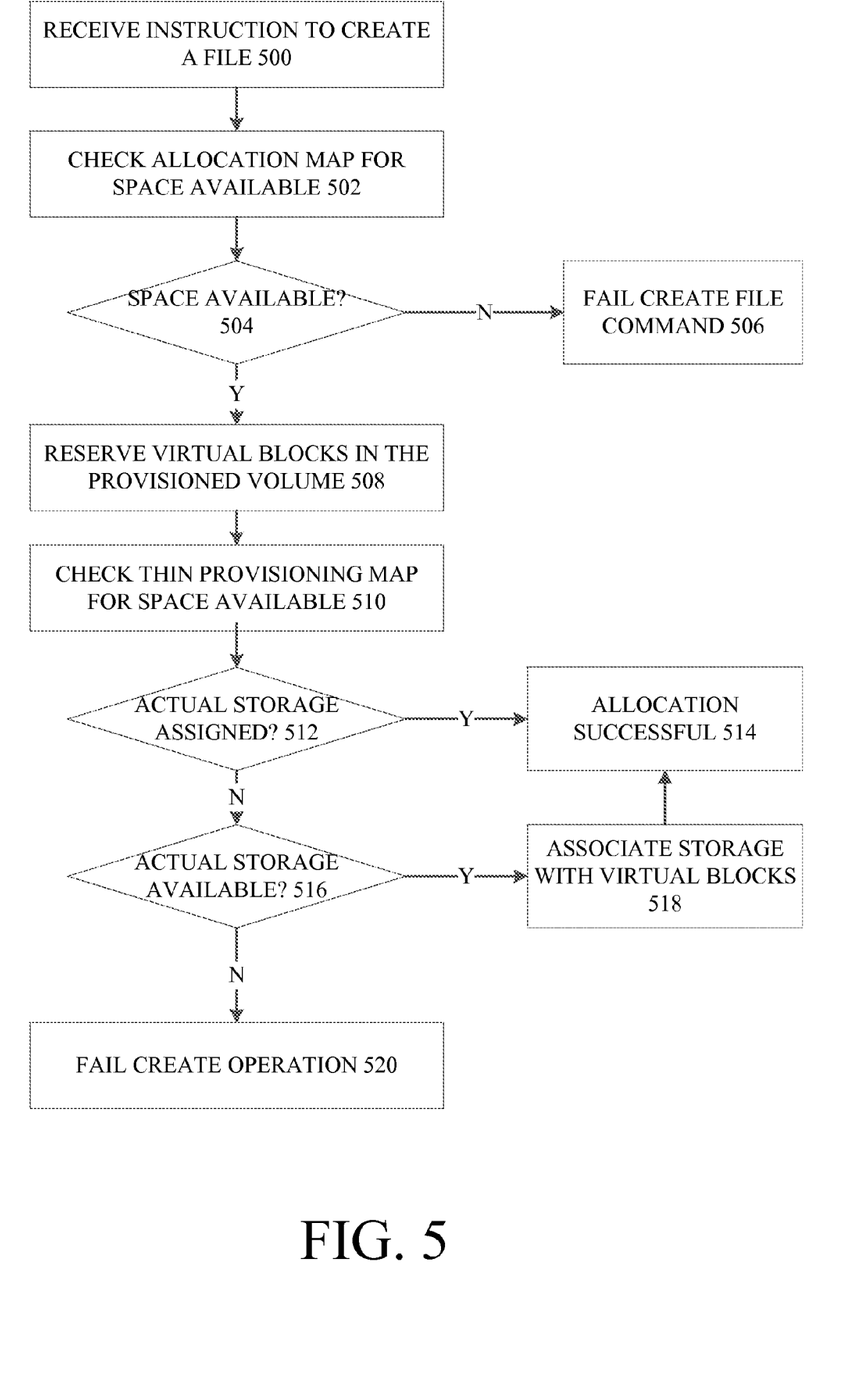
FIG. 5 is a flow chart describing an example implementation of an operation of creating a file on a thinly provisioned volume.

Referring now to FIG. 5, an example implementation of creating a file will now be described.

To create a file, the file system receives 500 an instruction to create a file, typically including a name for the file and an amount of space to be allocated for the file. The file system first checks 502 the allocation map to determine if virtual storage space is available in the provisioned volume. If virtual storage space is not available, as determined at 504, the create command fails, as indicated at 506. If virtual storage space is available, then virtual blocks within the provisioned volume are reserved 508 for the file. Next, the thin provisioning bitmap is checked 510 to determine if actual physical storage is available. If actual physical storage locations have been previously associated to the reserved virtual blocks, as determined at 512, then the file system can indicate 514 a successful allocation. If the actual physical storage locations have not yet been associated to the reserved virtual blocks, the storage system is requested to determine 516 if actual physical storage space is available. If actual physical storage is available, then the storage system can associate 518 actual physical storage locations with the virtual blocks, the file system can update its thin provisioning bitmap and indicate 514 a successful allocation. Otherwise, the allocation operation fails, as indicated at 520 and the reserved virtual blocks are released. The file system can report different types of failures in 506 (the assigned virtual storage space is exceeded) and 520 (insufficient actual physical storage available).

Figure 6:
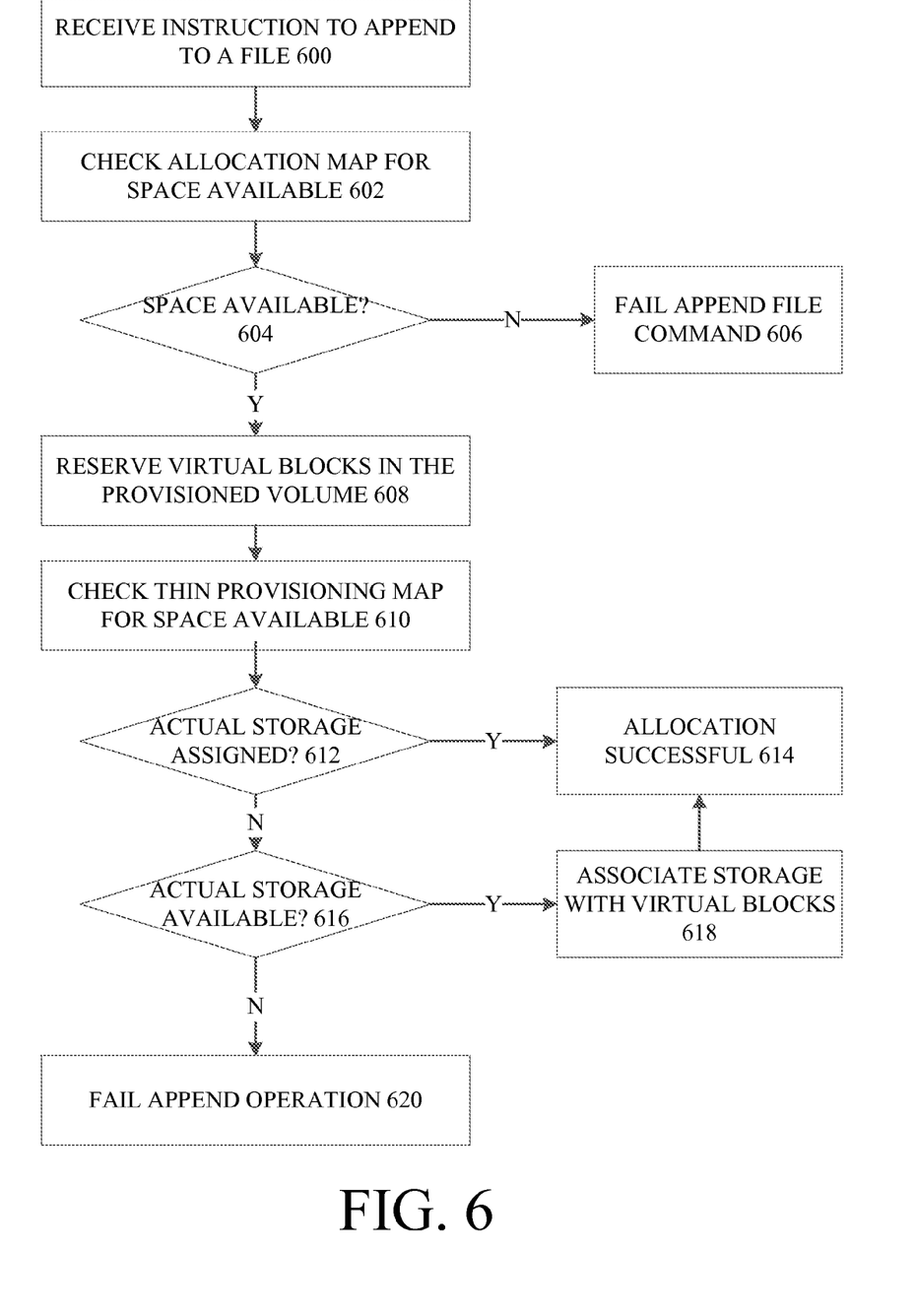
FIG. 6 is a flow chart describing an example implementation of an operation of writing data to a file in append mode on a thinly provisioned volume.

Referring now to FIG. 6, an example implementation of writing to a file to append data to the file will now be described.

To append data to a file, the file system receives 600 an instruction to append data to a file, typically including a name for the file and an amount of data to be appended to the file. The file system first checks 602 the allocation map to determine if virtual storage space is available in the provisioned volume for the additional data. If virtual storage space is not available, as determined at 604, the append command fails, as indicated at 606. If virtual storage space is available, then virtual blocks within the provisioned volume are reserved 608 for the file. Next, the thin provisioning bitmap is checked 610 to determine if actual physical storage is available. If actual physical storage locations have previously been associated to the reserved virtual blocks, as determined at 612, then the file system can indicate 614 a successful allocation. If the actual physical storage locations have not yet been associated to the reserved virtual blocks, the storage system is requested to determine 616 if actual physical storage space is available. If actual physical storage is available, then the storage system can associate 618 actual physical storage locations with the virtual blocks, the file system can update its thin provisioning bitmap and indicate 614 a successful allocation. Otherwise, the allocation operation fails, as indicated at 620 and the reserved virtual blocks are released. The file system can report different types of failures in 606 (the assigned virtual storage space is exceeded) and 620 (insufficient actual physical storage available).

It should be understood that any other operation that allocates storage for a file can be implemented to check for both available virtual blocks in a provisioned volume and actual physical storage available for those virtual blocks. Some example operations include but are not limited to: allocating space to unallocated regions of a sparse file, defragmenting one or more files, explicitly extending file size, compressing a file, and the like. Such operations cause a request to allocate storage due to a direct user request, e.g., create, append, defragment files, internal reservation for internal file system metadata, and internal reservation for anticipated increase in storage needed by a user file, e.g., memory mapping a compressed file or a sparse file for writing.

For example, a file system often allocates storage internally for metadata operations. In these cases, failure to allocate space for internal file system metadata leads to catastrophic failure in the file system and data corruption. To prevent this, the file system reserves storage space for itself, i.e., reserving virtual storage blocks in the allocation map and requesting the storage system to associate actual physical storage locations to these virtual storage blocks in the thin-provisioning map and reflecting this in its thin provisioning bitmap. The file system also can reserve space for user data that the file system anticipates may grow in size. For example, when a user opens a compressed file for writing using memory mapped input/output, the file system is programmed to accommodate the entire file in uncompressed form. In such cases, the system reserves potential virtual and actual physical storage space in a manner similar to how such storage space is reserved for the file system's internal metadata.

The granularity of allocation tracking in the allocation map and the thin-provisioning map can be different. In particular, the granularity of allocation tracking in the thin-provisioning map can be larger (for example, the size of a slab) than the granularity of allocation tracking in the allocation map (for example, the size of a conventional disk block). This different granularity is used so that the storage system assigns actual physical storage locations to a virtual block (which is costly in terms of performance) less frequently than the file system reserves virtual blocks in the allocation map.

Having now described an example implementation of thin provisioning, it should now be apparent that a variety of implementations are possible. For example, the file system can be implemented on a computer that accesses one or more volumes; alternatively, the file system can reside on one computer and be accessed by another computer over a computer network.

The system can be implemented in a variety of ways. While the example above describes a two layer file and storage system, with each layer maintaining a map, the system can be implemented as a single system or with multiple layers, as well as different mappings and data structures that enable a determination of whether available virtual space for a file has associated actual physical storage available for the file.

Having now described an example implementation, a computer in which a file system is designed to operate will now be described. The following description is intended to provide a brief, general description of an example suitable computer on which such a file system can be implemented. The file system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
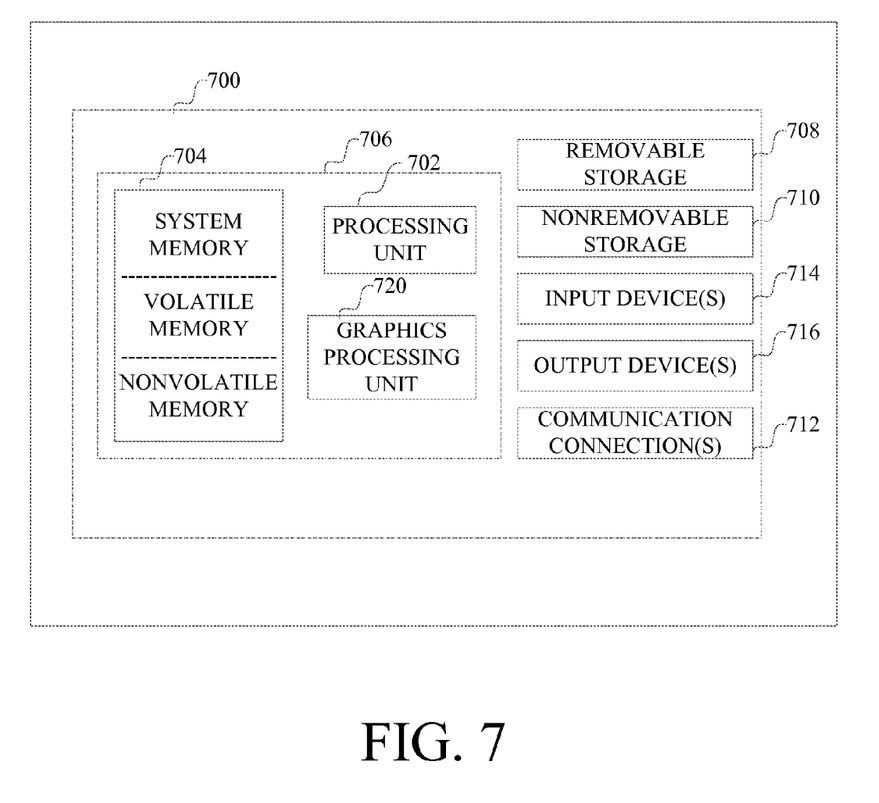
FIG. 7 is a block diagram of an example computer in which such a file system can be implemented.

FIG. 7 illustrates one example of a suitable computer. In FIG. 7, this example computer 700, in its most basic configuration, includes at least one processing unit 702 and memory 704. The computer may include multiple processing units and/or additional co-processing units such as graphics processing unit 720. Depending on the exact configuration and type of computer, memory 704 may be volatile (such as RAM), non-volatile (such as ROM, flash memory, etc.) or some combination of the two. This most basic configuration is illustrated in FIG. 7 by dashed line 706.

Additionally, computer 700 may also have additional features/functionality. For example, computer 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 700. Any such computer storage media may be part of computer 700.

Computer 700 may also contain communications connection(s) 712 that allow the device to communicate with other devices over communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communication connections 712 include any device, such as a network interface, that allows the computer 700 to transmit data to or receive data from such communication media.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here. Such input and output device may be designed to work together to provide a natural user interface (NUI), which is any interface technology that enables a user to interact with a device in a "natural" manner, free from artificial constraints imposed by input devices such as mice, keyboards, remote controls, and the like Examples of NUI methods include those relying on speech recognition, touch and stylus recognition, gesture recognition both on screen and adjacent to the screen, air gestures, head and eye tracking, voice and speech, vision, touch, gestures, and machine intelligence, and can include touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Such a files system may be implemented in the general context of software, including computer-executable instructions and/or computer-interpreted instructions, such as program modules, being processed by a computer. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer comprising:
    a thinly provisioned storage system comprising a plurality of storage devices;
    storage media comprising at least one of a memory or a storage device and being arranged to store an allocation map and a thin provisioning map, the allocation map associating files with virtual storage locations and the thin provisioning map associating virtual storage locations with actual physical storage locations on the plurality of storage devices; and
    a processing system comprising at least one processing unit configured, in response to a request to allocate storage space for a file on the plurality of storage devices, to:
    determine whether virtual storage space is available in the thinly provisioned storage system for the file using the allocation map;
    in response to a determination that virtual storage space is available for the file,
        reserve the virtual storage space for the file in the allocation map;
        determine whether actual physical storage space is available for the reserved virtual storage space using the thin provisioning map; and
        in response to a determination that actual physical storage space is available among the plurality of storage devices for the file, reserve the actual physical storage space for the file in the thin provisioning map and associate the actual physical storage space with the virtual storage space reserved for the file in the allocation map.

2. The computer of claim 1, wherein the processing system is further configured to fail the request to allocate in response to a determination that insufficient virtual storage space is available for the file.

3. The computer of claim 1, wherein the processing system is further configured to the request to allocate, and to release reserved virtual storage space for the file, in response to a determination that insufficient actual physical storage space is available for the file.

4. The computer of claim 1, wherein the processing system is further configured to communicate, to a display, an amount of storage provisioned for a user and an amount of physical storage actually available for the user.

5. The computer of claim 1, wherein the processing system is further configured to access a file system, the file system configured to determine whether virtual storage space is available for the file, and to access a storage system, the storage system configured to determine whether actual physical storage space is available for the file.

6. The computer of claim 5, wherein, to store the thin provisioning map, the storage system is configured to maintain a thin provisioning location map, wherein the thin provisioning location map maps virtual storage locations to actual storage locations, and the file system is configured to maintain a thin provisioning bitmap, wherein the thin provisioning bitmap indicates whether a volume is thinly provisioned and, for each range of virtual storage space, whether actual storage space has been assigned to that range.

7. A computer-implemented process comprising:
    receiving, by a file system of a computer, a request to allocate storage for a file in a storage system accessible by the computer, wherein the storage system comprises a thinly provisioned storage system comprising a plurality of storage devices;
    in response to the request to allocate storage for a file, determining whether virtual storage space is available in the thinly provisioned storage system for the file using an allocation map stored in a storage medium and associating files with virtual storage locations;
    in response to a determination that virtual storage space is available for the file,
        reserving the virtual storage space for the file in the allocation map, and
        determining whether actual physical storage space is available among the plurality of storage devices in the storage system for the reserved virtual storage space using a thin provisioning map stored in a storage medium and associating virtual storage locations with actual physical storage locations;
    in response to a determination that actual physical storage space is available for the file, reserving the actual physical storage space for the file and associating the actual physical storage space with the virtual storage space reserved for the file in the thin provisioning map.

8. The computer-implemented process of claim 7, wherein the request to allocate storage for a file is part of an operation to create a file.

9. The computer-implemented process of claim 8, further comprising failing the create operation in response to a determination that insufficient virtual storage space is available for the file.

10. The computer-implemented process of claim 8, further comprising failing the create operation in response to a determination that insufficient actual physical storage space is available for the file.

11. The computer-implemented process of claim 10, further comprising releasing reserved virtual storage space for the file in response to a determination that insufficient actual physical storage space is available for the file.

12. The computer-implemented process of claim 7, wherein the file system performs the determining of whether virtual storage space is available for the file, and wherein the storage system performs the determining of whether actual physical storage space is available for the file.

13. The computer-implemented process of claim 7, further comprising:
    the storage system maintaining a thin provisioning location map that maps virtual storage locations to actual storage locations; and the file system maintaining a thin provisioning bitmap indicating whether a volume is thinly provisioned and, for each range of virtual storage space, whether actual storage space has been assigned to that range.

14. An article of manufacture comprising:
a computer storage medium comprising at least one of a memory and a storage device;
computer program instructions stored on the computer storage medium which, when processed by a processing system, instruct the processing system to perform a process comprising:
receiving a request to allocate storage for a file in a thinly provisioned storage system comprising a plurality of storage devices;
in response to the request to allocate storage for a file,
  determining whether virtual storage space is available in the thinly provisioned storage system for the file using an allocation map stored in a storage medium and associating files with virtual storage locations;
  in response to a determination that virtual storage space is available for the file,
    reserving the virtual storage space for the file in the allocation map, and
    determining whether actual physical storage space is available among the plurality of storage devices for the reserved virtual storage space using a thin provisioning map stored in a storage medium and associating virtual storage locations with actual physical storage locations;
    in response to a determination that actual physical storage space is available for the file, reserving the actual physical storage space for the file and associating the actual physical storage space with the virtual storage space reserved for the file in the thin provisioning map.

15. The article of manufacture of claim 14, wherein the request to allocate storage for a file is part of an operation to create a file.

16. The article of manufacture of claim 15, wherein the process further comprises failing the create operation in response to a determination that insufficient virtual storage space is available.

17. The article of manufacture of claim 15, wherein the process further comprises failing the create operation in response to a determination that insufficient actual physical storage space is available.

18. The article of manufacture of claim 17, wherein the process further comprises releasing reserved virtual storage space for the file if insufficient actual physical storage space is available.

19. The article of manufacture of claim 14, wherein the processing system includes a file system and a storage system, wherein the computer program instructions configure the file system to determine whether virtual storage space is available for the file, and the computer program instructions configure the storage system to determine whether actual physical storage space is available for the file.

20. The article of manufacture of claim 19, wherein the storage system is configured to maintain a thin provisioning location map that maps virtual storage locations to actual storage locations, and the file system is configured to maintain a thin provisioning bitmap indicating whether a volume is thinly provisioned and, for each range of virtual storage space, whether actual storage space has been assigned to that range.

* * * * *